May 5, 1964 J. R. PRENDERGAST ETAL 3,132,018
CENTRIFUGAL CASTING APPARATUS FOR MAKING A GLASS ARTICLE
Filed Sept. 26, 1960 12 Sheets-Sheet 1

INVENTORS.
JOHN R. PRENDERGAST
BY WILLIAM A. STUTSKE
W. A. SCHAICH &
E. J. HOLLER
ATTORNEYS

May 5, 1964 J. R. PRENDERGAST ETAL 3,132,018
CENTRIFUGAL CASTING APPARATUS FOR MAKING A GLASS ARTICLE
Filed Sept. 26, 1960 12 Sheets-Sheet 2

INVENTORS
JOHN R. PRENDERGAST
WILLIAM A. STUTSKE
BY
W.A. SCHAICH & E.J. HOLLER
ATTORNEYS

May 5, 1964   J. R. PRENDERGAST ETAL   3,132,018
CENTRIFUGAL CASTING APPARATUS FOR MAKING A GLASS ARTICLE
Filed Sept. 26, 1960                                   12 Sheets-Sheet 3

INVENTORS
JOHN R. PRENDERGAST
WILLIAM A. STUTSKE

W.A. SCHAICH & E.J. HOLLER
ATTORNEYS

May 5, 1964  J. R. PRENDERGAST ETAL  3,132,018
CENTRIFUGAL CASTING APPARATUS FOR MAKING A GLASS ARTICLE
Filed Sept. 26, 1960  12 Sheets-Sheet 4

INVENTORS
JOHN R. PRENDERGAST
WILLIAM A. STUTSKE
W.A.SCHAICH & E.J.HOLLER
ATTORNEYS

May 5, 1964  J. R. PRENDERGAST ETAL  3,132,018
CENTRIFUGAL CASTING APPARATUS FOR MAKING A GLASS ARTICLE
Filed Sept. 26, 1960  12 Sheets-Sheet 8

INVENTORS
JOHN R. PRENDERGAST
WILLIAM A. STUTSKE
W. A. SCHAICH & E. J. HOLLER
ATTORNEYS

United States Patent Office
3,132,018
Patented May 5, 1964

3,132,018
CENTRIFUGAL CASTING APPARATUS FOR MAKING A GLASS ARTICLE
John R. Prendergast and William A. Stutske, Toledo, Ohio, assignors, by mesne assignments, to Owens-Illinois Glass Company, Toledo, Ohio, a corporation of Ohio
Filed Sept. 26, 1960, Ser. No. 58,562
6 Claims. (Cl. 65—302)

The present invention relates to a method of and apparatus for the manufacture of a glass article, such as a cathode-ray tube envelope or the like, by a combined press-and-spin process.

More particularly, the present invention proposes the manufacture of such an article having a non-circular interior apex configuration and a substantially rectangular open end by pressing a molten glass gob between a centrifugal mold and a pressing plunger followed by centrifugal formation of the remainder of the article.

Recently developed cathode-ray tubes, such as television picture tubes, incorporate envelopes or "funnels" having widely flaring side walls defining included angles of greater than 110°, thereby shortening the overall tube length between the deflection yoke and the face plate or viewing surface. However, extreme electron beam deflection angles are required, and increased beam clearance at the small or apex end of the tube is necessary. Consequently, it has become necessary to form the interior apex surface to a non-circular configuration which cannot be formed by the conventional centrifugal casting process normally used in making envelopes from molten glass.

Such a glass article, specifically a cathode-ray tube envelope, is disclosed in the co-pending application of James C. Coleman and Ray W. Mayhew, Serial No. 841,-730, filed September 23, 1959, now Patent No. 3,005,122, issued October 17, 1961, and assigned to the assignee of the present invention.

The instant invention now proposes an improved apparatus and method of making a cathode-ray tube of the type hereinbefore described and set forth in said earlier filed, copending application, Serial No. 841,730.

Briefly, the apparatus of the present invention includes an open-topped mold rotatable about a vertical axis and defining an apex portion adjacent the lower extremity thereof. A vertically movable beam or bridge is supported by a pair of spaced columns for vertical displacement relative to the mold, such beam or bridge carrying a depending pressing plunger insertable axially into the mold into pressing contact with a molten glass gob previously dropped into the mold and retractable from contact with the glass gob prior to centrifugal formation of the glass article following the pressing operation. This pressing plunger is displaceable longitudinally of the beam, while being vertically displaceable with the beam, the longitudinal displacement moving the pressing plunger from axial alignment with the mold and accommodating the dropping of the molten glass gob into the mold. The pressing plunger is normally non-rotatable, but is free for rotation following the pressing operation and prior to full retraction of the pressing plunger from the centrifugal mold.

The apparatus also includes a fluid pressure actuated control system which is sequence operated to carry out the various steps of the process, including retraction of the pressing plunger from axial alignment with the mold to accommodate the introduction of the glass gob into the mold, longitudinal displacement of the plunger into axial alignment with the mold, concurrent lowering of the beam and the pressing plunger to press form a portion only of the gob intermediate the pressing plunger and the mold, the concurrent retraction of the pressing plunger from contact with the gob and the freeing of the pressing plunger for rotation and, finally, the initiation of rotation of the mold for centrifugally forming the non-press-formed portions of the envelope.

It is, therefore, an important object of the present invention to provide an improved method of and apparatus for the formation of a glass article by what is, basically, a centrifugal molding process, but wherein a portion of the article is press-formed prior to centrifugal molding.

Another important object of this invention is the provision of an improved apparatus for the manufacture of a glass article including a pressing plunger for press-forming a portion of a gob interiorly of a centrifugal mold, the pressing plunger being retracted prior to the initiation of centrifugal molding.

It is a further object of this invention to provide an apparatus for the manufacture of a glass article by a combined pressing and centrifugal casting technique and including a pressing plunger supported above an open-topped mold, the pressing plunger being supported for movement into alignment with the mold and then into the mold to pressform a portion of a molten glass gob in the mold prior to the centrifugal casting of the remainder of the article.

A further object of this invention is the provision of the method of making a cathode ray tube envelope or the like having a press-formed portion and a centrifugally molded portion by initially press-forming a portion of the article intermediate a pressing plunger and a centrifugal mold held against rotation in rotatably oriented position followed by retraction of the pressing plunger from contact with the molten glass, freeing the pressing plunger for rotation, and centrifugally rotating the mold to distribute the remainder of the gob therein.

Yet another, and no less important, object of the present invention is the provision of an apparatus for a combined pressing and centrifugal molding operation including a pressing plunger and a rotatable mold, the apparatus comprising a fluid pressure actuated control system which is sequence operated to sequentially carry out pressing and centrifugal casting operations.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
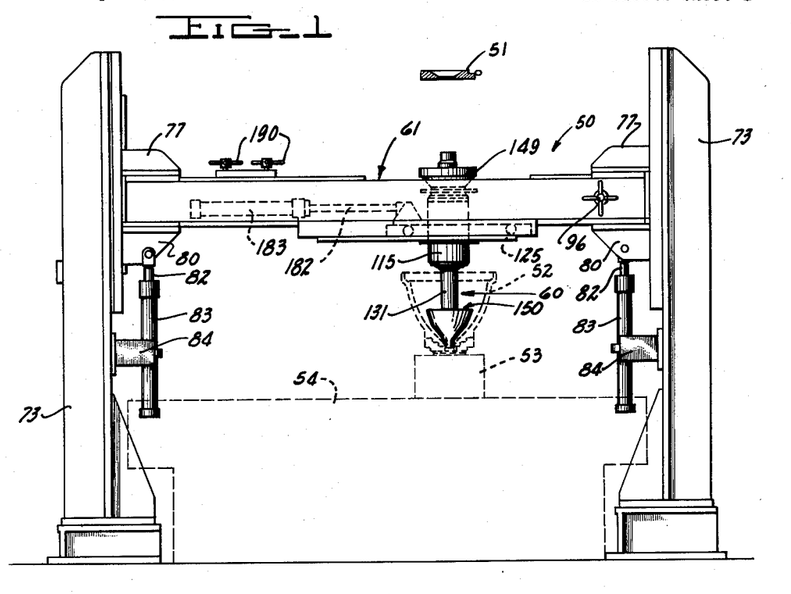
FIGURE 1 is a side elevational view of an apparatus of the present invention.

As shown on the drawings:

In FIGURE 1, reference numeral 50 refers generally to an apparatus of the present invention including an upper forehearth feeder or orifice 51 schematically represented and through which gobs of molten glass are expressed downwardly to drop into open-topped molds 52 positioned therebeneath.

Figure 2:
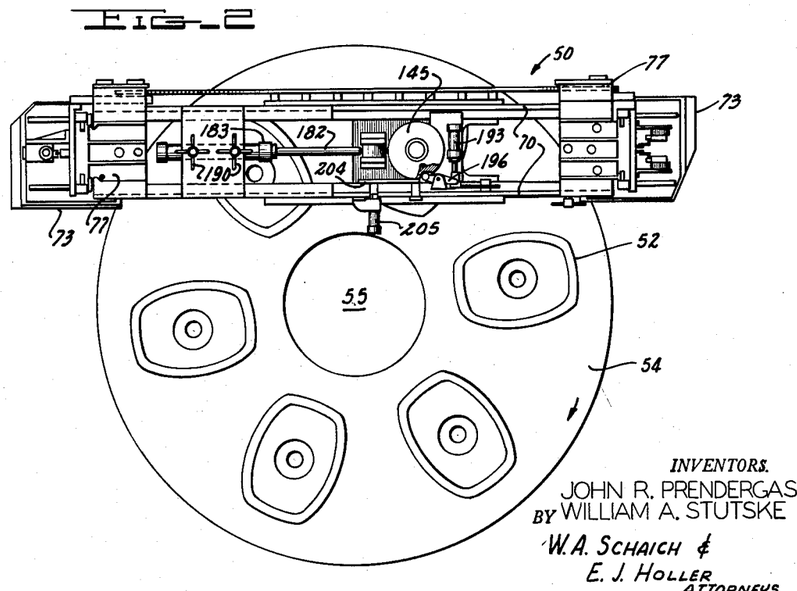
FIGURE 2 is a plan view of the apparatus of FIGURE 1.

As best shown in FIGURES 1 and 2, a plurality of such molds 52 are preferably provided at spaced operating stations 53 located on a rotatable mold table 54. The stations 53 of the work table 54 are provided to sequentially perform various operations on an article formed within each of the molds 52, such operations including, if desired, an initial molding operation, cooling operations, cut off operations and the like. Since the present invention is concerned only with the forming operation, only one such station will be described in detail.

The table 54 is preferably rotated in a clockwise direction around a central supporting post 55 by a suitable rotatable drive mechanism (not shown). The individual molds 52 are rotatable about vertical axes by suitable fluid pressure actuated drive mechanisms which are not shown in detail but which are schematically indicated on FIGURE 16 hereof and also in FIGURE 10. The molds 52 are driven by a fluid motor 56 and jaw clutches 57 interconnecting the motor and the drive shafts 58 for the individual molds 52. The clutches 57 are controlled into and out of engagement by cam followers 59 which accurately rotationally index the individual molds 52 for a purpose to be hereafter more fully described.

Figure 3:
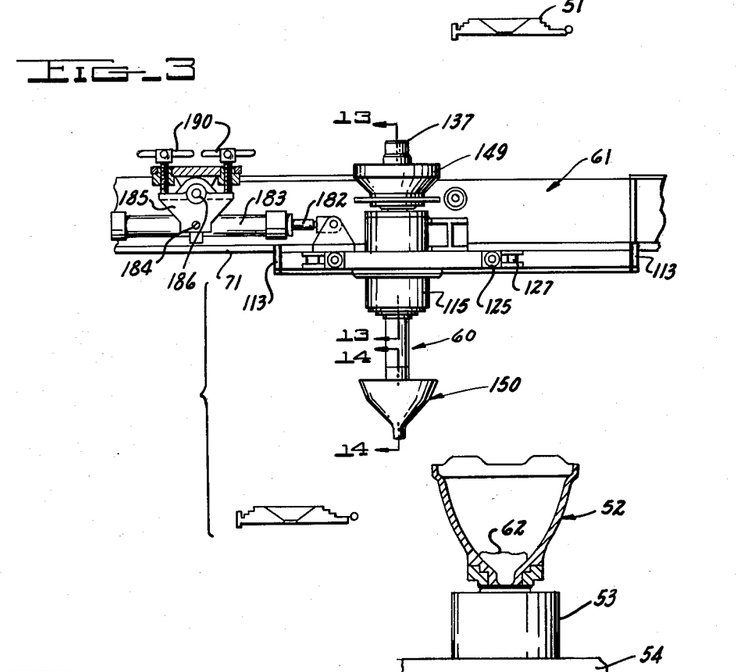
FIGURE 3 is a fragmentary view similar to FIGURE 1 illustrating an initial step of the process in which the glass gob is placed in the mold.
Figure 4:
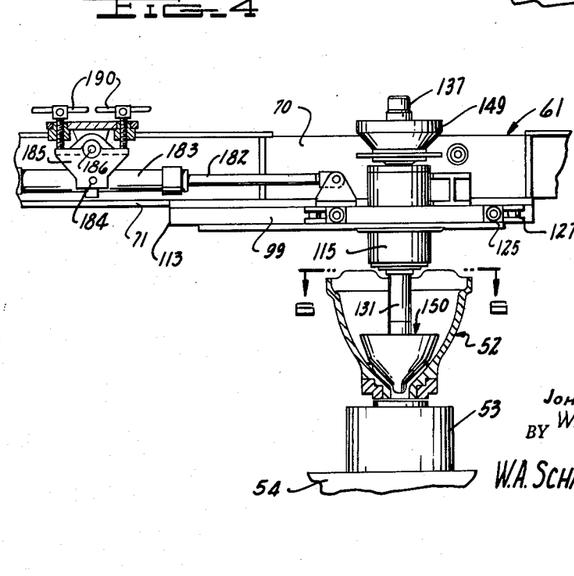
FIGURE 4 is a view similar to FIGURE 3 showing the pressing operation.
Figure 5:
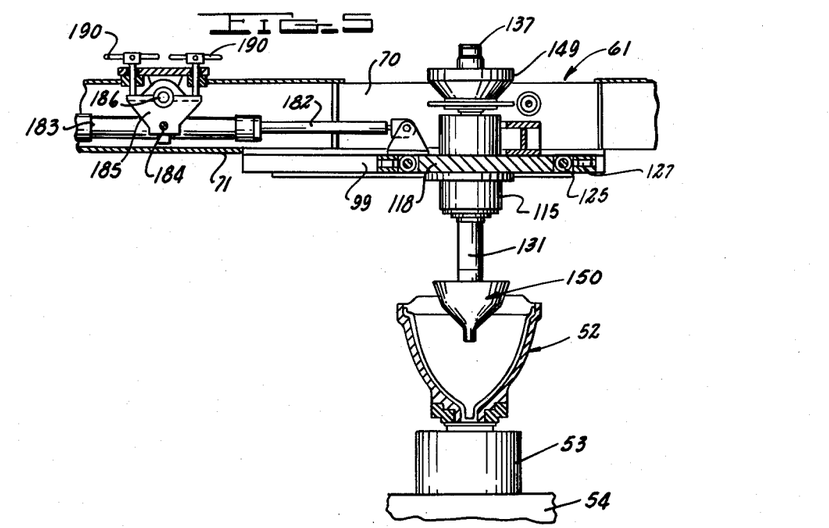
FIGURE 5 is a view similar to FIGURES 3 and 4 illustrating the apparatus at the conclusion of the process.
Figure 6:
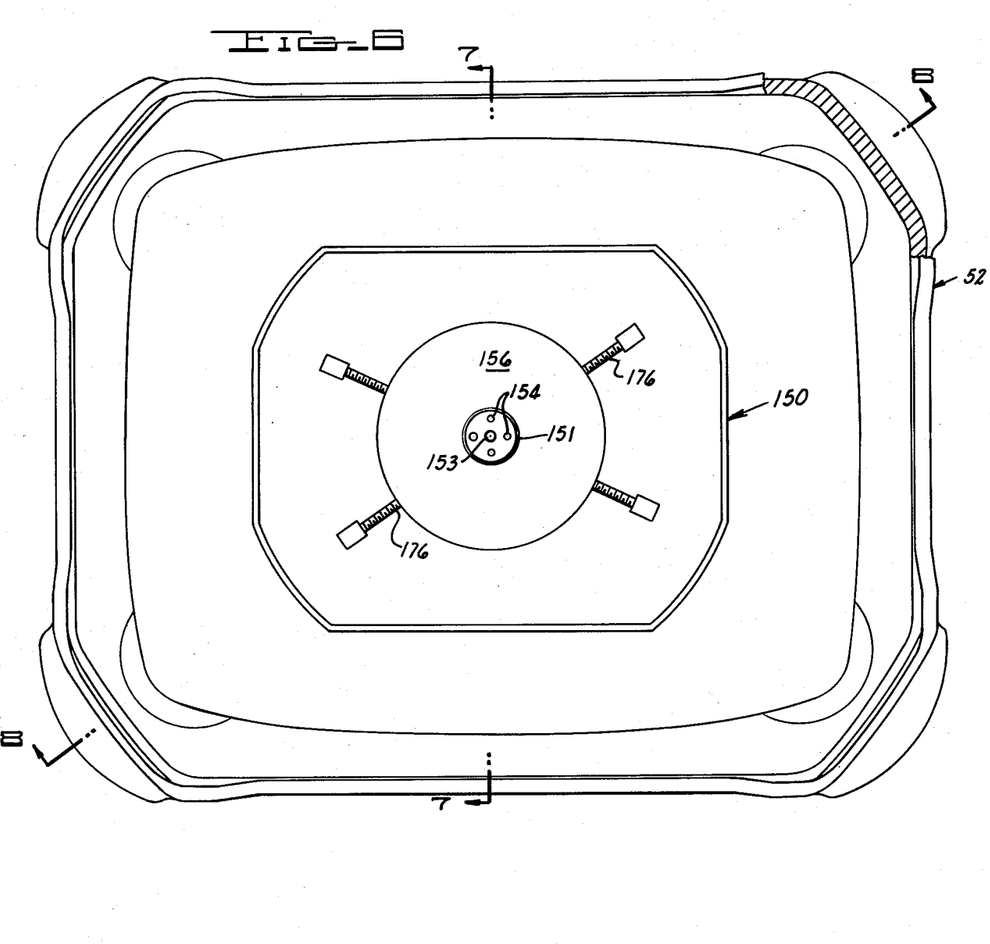
FIGURE 6 is an enlarged plan view, with parts broken away in section, of the mold and pressing plunger.

Basically, the process of the present invention is more or less diagrammatically represented in FIGURES 3 through 5 of the drawings wherein a pressing plunger, indicated generally at 60, is carried by a horizontal beam 61 for lateral and vertical displacement relative to the mold 52 positioned underneath the gob feeder 51. As shown in FIGURE 3, the pressing plunger 60 is laterally positioned to one side of the vertical direction of fall of a gob 62 during its gravity transfer from the feeder 51 to the mold 52. Next, the pressing plunger 60 is moved laterally into alignment with the vertical rotational axis of the mold 52 by transverse movement of the pressing plunger guided by the beam 61. Next, the pressing plunger 60 is lowered by lowering movement of the beam 61 to engage the pressing plunger 60 with the gob 62 and to press-form a part only of the gob 62 intermediate the pressing plunger 60 and the interior wall surfaces of the mold 52.

Following the pressing operation, the pressing plunger 60 is elevated and released for free rotation and the mold 52 is then rotated to centrifugally form the non-pressformed portions of the gob 62 against the interior walls of the mold 52. Retraction of the pressing plunger during the centrifugal forming operation is illustrated in FIGURE 5 of the drawings. The vertical retraction of the pressing plunger is continued, and the plunger 60 is moved laterally to its position of FIGURE 3 relative to the feeder 51 and the mold 52 so as to be ready for the next pressing and centrifugal forming operation following the next stepped clockwise movement of the mold table 54 to position a subsequent mold 52 in alignment with the feeder 51.

Considering now in greater detail the structure of the beam 61 as illustrated in FIGURES 10 through 13, inclusive, the beam comprises a pair of upstanding side rails 70 which are laterally spaced and which surmount laterally extending lower guide plates 71, the side plates 70 and the guide plates 71 being secured together, as by welding at 72, to provide an inverted T section.

The beam 61 is supported at each end thereof by a vertically extending support column 73, the columns being spaced to either side of the mold table 54 and being provided with lower supporting feet 74. The columns 73 are provided with facing vertically extending support surfaces 75 contacted by rollers 76 carried by beam support brackets 77 journalled by the rollers 76 for vertical movement on the columns.

The end support brackets 77 define interior, generally rectangular recesses 78 into which the ends of the beam 61 extend. Also carried by each of the support brackets 77 is a pair of spaced mounting plates 80 to which are secured the end shackle 81 of the actuating rod 82 of a fluid pressure actuated cylinder 83 medially anchored, as by a bracket 84, to a lower portion of the columns 73. Upon actuation of the cylinders 83, the actuating rods 82 thereof are extended or retracted to elevate or lower the beam 61 relative to the fixed columns 73.

Figure 12:
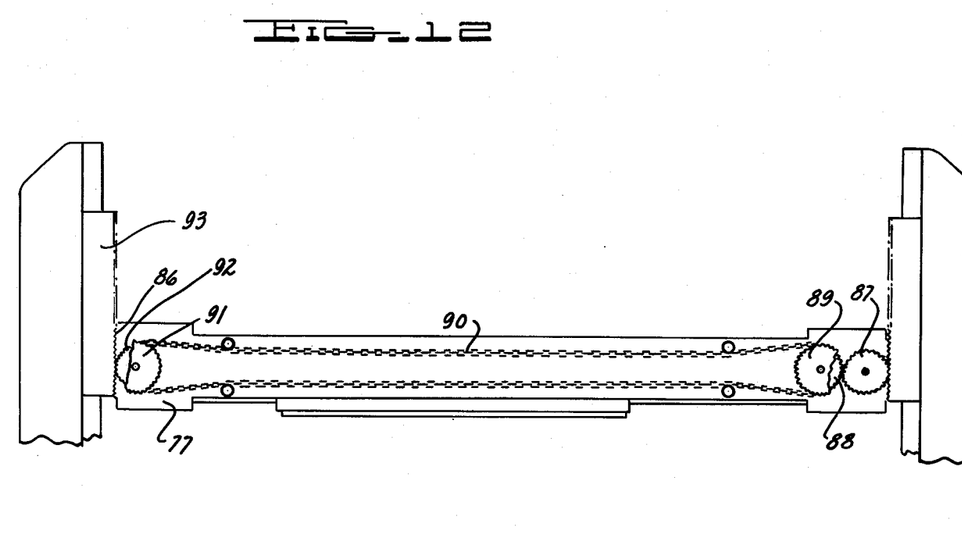
FIGURE 12 is a view with parts broken away and in section taken along the plane 20—20 of FIGURE 11.

To assure concurrent displacement of the beam ends, each supporting column 73 carries a vertical rack 85 having teeth 86 engaged by a pinion 87 carried for rotation by the adjacent supporting bracket 77. The pinion 87 engages a second pinion 88 coaxial with and co-rotatable with a sprocket 89 partially lapped by a chain 90. This chain 90 also laps a second sprocket 91 carried by the other supporting bracket 77 and co-rotatable with a pinion 92 engaging a rack 93 on the other of the columns 73. In this manner, displacement of the two ends of the beam to the same extent upon any degree of actuation of the cylinders 83 is assured, and the beam is always maintained in a truly horizontal position (FIGURE 12).

The beam ends are inserted into the recesses 78 defined by the end attachment brackets 77, the beam being snugly supported against vertical displacement by the extended surface engagement between the beam ends and the upper and lower extremities of the recesses 78, respectively. However, the side walls 79 of the brackets 77 are spaced apart to an extent somewhat greater than the lateral dimension of the beam 61, thereby affording limited lateral shifting of the beam 61 relative to the end columns 73. Lateral shifting of the beam or bridge 61 is accommodated by a vertical pivot pin 95 (FIGURE 10) interconnecting one of the end brackets 77 and that end of the beam 61 inserted into the associated recess 78. Such arcuate movement is accomplished by a hand wheel 96 rotatably carried by the side walls 79 of the other bracket 77 and having its free end threaded into a threaded aperture (not shown) formed in the adjacent side plate 70 of the beam 61.

Figure 10:
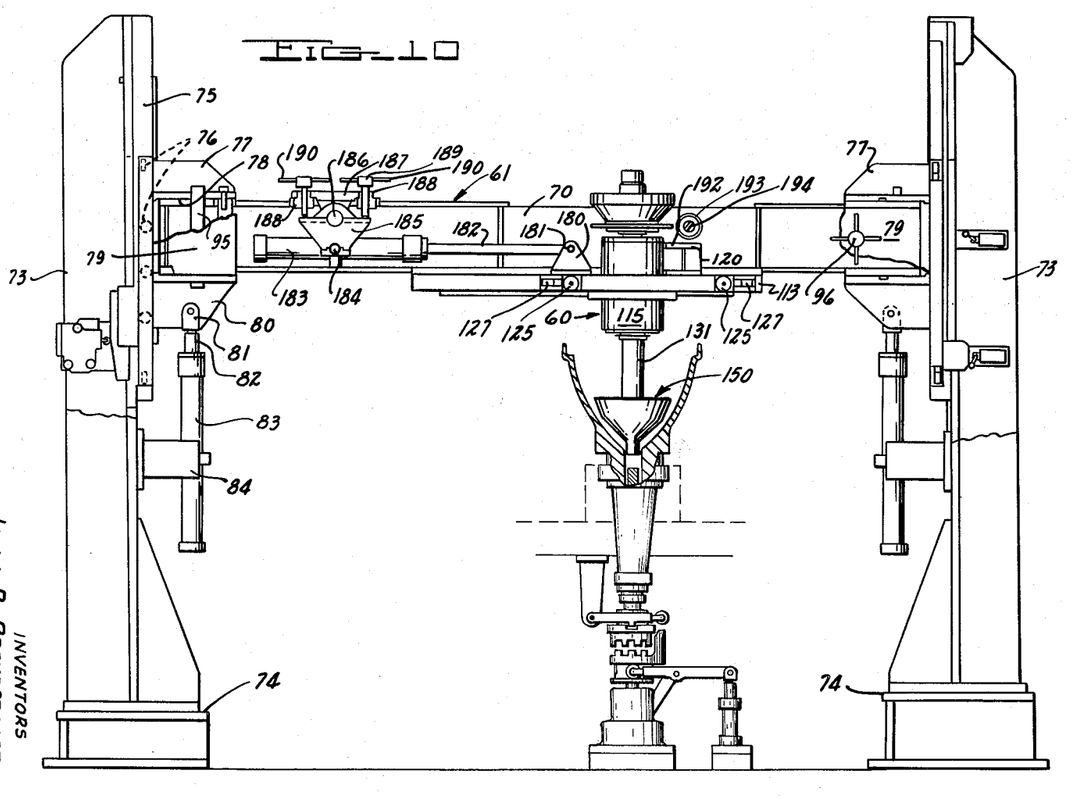
FIGURE 10 is an enlarged view similar to FIGURE 1 illustrating the apparatus in greater detail.
Figure 13:
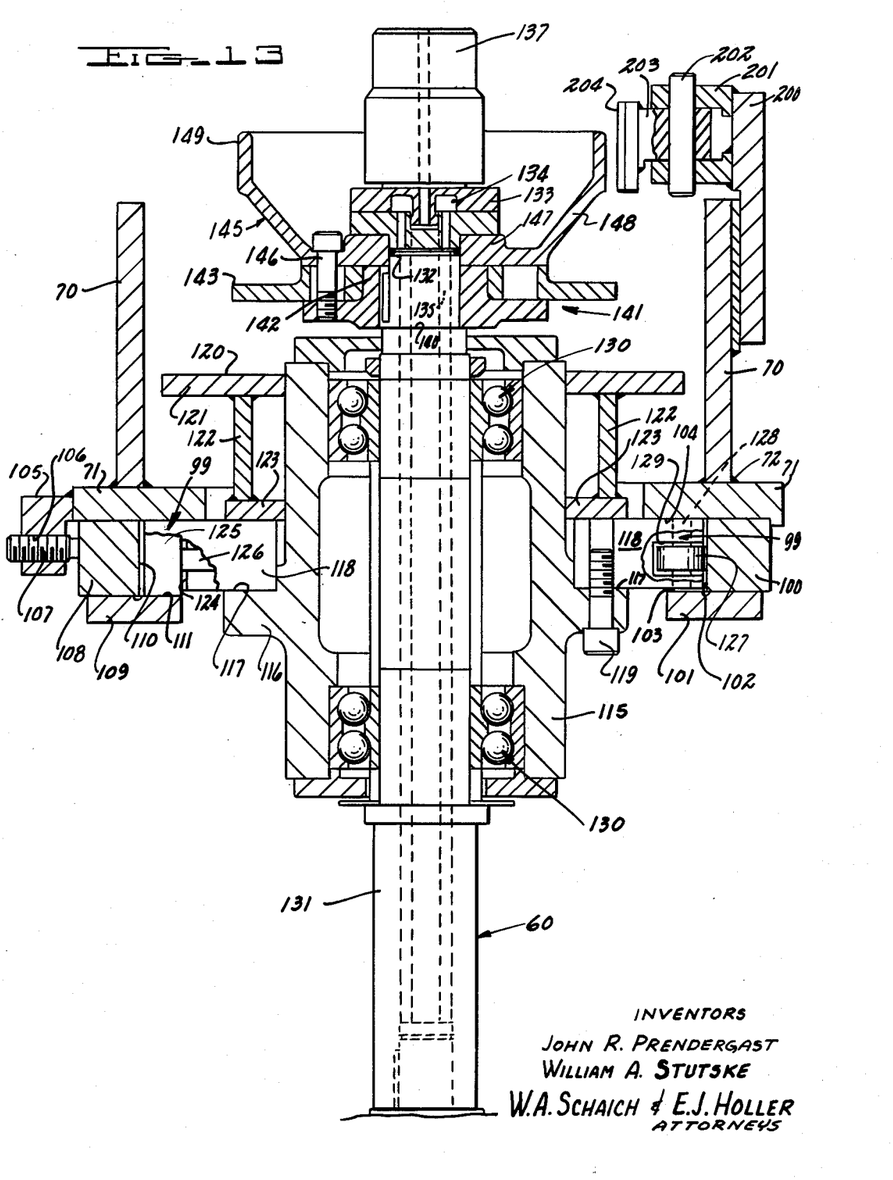
FIGURE 13 is an enlarged sectional view taken along the plane 13—13 of FIGURE 3.

As best shown in FIGURES 10 and 13, a medial portion of the beam 61 is provided with means defining guideways 99 for guiding lateral displacement of the pressing plunger. The guideway 99 includes a lateral guide block 100 fixed to one of the lower stiffening plates 71 secured to one of the side plates 70 and a lower track block 101 secured to the slide block 100. The slide block 100 has a side guiding surface 102 and the lower block 101 has an upper guide surface 103 which cooperates with the undersurface 104 of the plate 71 to cooperably define the laterally opening guideway 99 at one side of the bridge 61. The lower stiffening plate 71 of the other side plate 70 carries a plurality of adjustment blocks 105 secured thereto and having lateral threaded apertures 106 into which are threaded individual set screws 107 abutting a guide block 108. The block 108 and a lower track block 109 having interior guide surfaces 110 and 111 cooperating with the undersurface 112 of the reinforcing plate 71 adjacent thereto to define a second laterally opening guideway 99. The cooperative channels 99 defined, respectively, by the surfaces 102, 103, 104 and 110, 111, 112 are closed at their ends by vertical supporting blocks 113 which rigidify the lower guide blocks 101 and 109 from the overlying support plates 71.

The pressing plunger 60 is supported in a cylindrical housing 115 having an outer peripheral flange 116 provided with an upper support surface 117 upon which is mounted a pair of diametrically opposed elongated slide blocks 118 secured to the housing by suitable means, as by cap screws 119. Overlying the slide blocks 118, and also secured to the housing 115 to provide an upper support surface 120 for a purpose to be hereinafter more fully described, is a superstructure including an upper support plate 121, a plurality of vertically extending support legs 122 and a lower support plate 123 serving to confine the slide blocks 118 against the housing ledge surface 117. The elongated slide blocks 118 are recessed, as at 124, to accommodate a plurality of longitudinally spaced guide rollers 125 journalled on horizontal axles 126 and confined in the guideways 99. To provide further lateral stability for the pressing plunger, additional carriage rollers 127 are supported by vertical axles 128 within recesses 129 in the slide blocks 118 for contact with the side surfaces 102 and 110 of the slide blocks 110 and 108, respectively.

The pressing plunger 60 is supported for rotation about its vertical axis within the casing or housing 115 by spaced roller thrust bearings 130 journalling the pressing plunger spindle 131. The spindle 131 terminates, as at 132, above the upper bearing 130 and is surmounted by a distributor 133 having an annular fluid passage 134 therein communicating with a plurality of fluid passages 135 extending throughout the spindle 131 and parallel to the spindle axis. Extending centrally of the passages 135 is an axial fluid passage 136 which is also extended above the distributor 133 through an upper cap 137 surmounting the distributor 133 and spindle 131. The cap 137 is connected to a supply conduit for a fluid, such as air or water, under pressure, the fluid flowing through the axial passage 136 completely through the spindle 131. Similarly, fluid can pass through the surrounding passages 135 from the annular passage 134 within the distributor 133. The purpose of this coolant fluid will be hereinafter more fully described.

Figure 11:
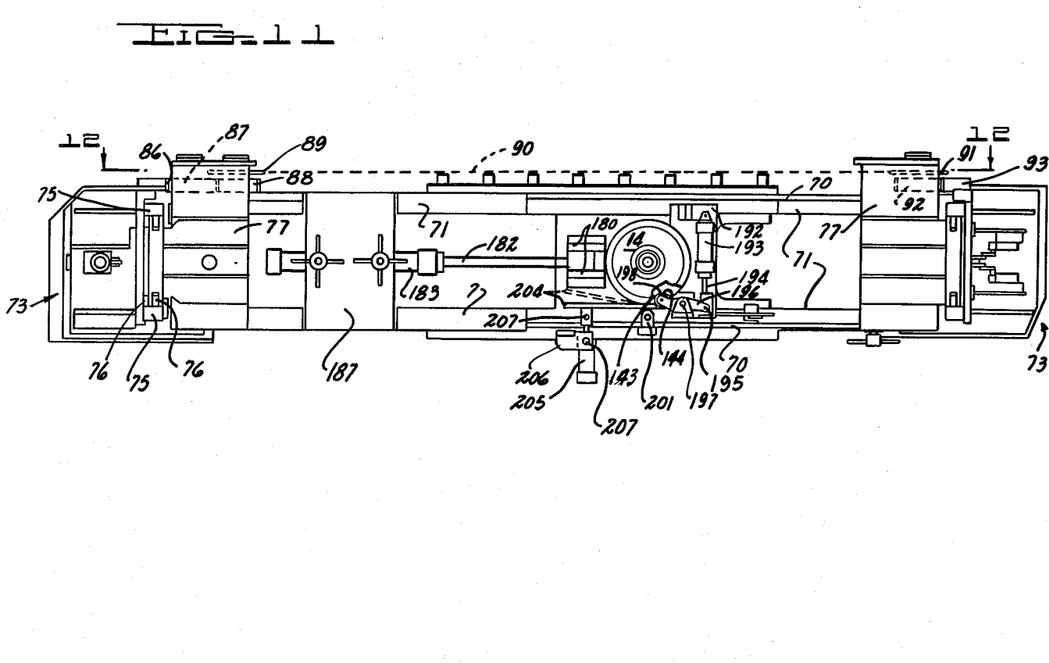
FIGURE 11 is an enlarged plan view similar to FIGURE 2.

Surmounting a shoulder 140 on the spindle 131 and keyed thereto for rotation therewith is an orienting assembly 141 for securing the spindle 131 in a desired rotatable position. This orienting assembly 141 comprises a hub 142 keyed to the spindle and surrounded by an annular detent plate 143 having a peripheral detent recess 144 therein (FIGURE 11).

Surmounting the plate 143 is an annular orienting shoe 145 secured to the hub member 142 and to the detent plate 143 for rotation therewith by a plurality of cap screws 146. This orient shoe comprises a lower hub portion 147, an upwardly and outwardly flaring, frusto-conical medial section 148 and an upper annular exterior friction surface 149.

Figure 14:
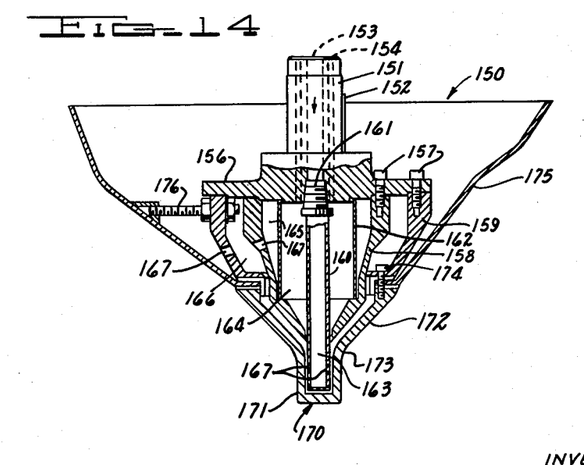
FIGURE 14 is an enlarged sectional view taken along the plane 14—14 of FIGURE 3.

Secured to the lower end of the spindle 131 is a pressing tool 150 illustrated in detail in FIGURE 14 of the drawings. The tool 150 forms the glass-contacting portion of the pressing plunger 60 and comprises a central hub portion 151 which is secured, as by a key 152, to the lower extremity of the spindle 131 for co-rotation therewith. This hub portion is provided with a central fluid passage 153 registering with the central fluid passage 136 of the spindle 131 and with a plurality of surrounding fluid passages 154 communicating with the passages 135 in the spindle 131.

The hub 151 terminates at its lower end in an enlarged radial flange 156 to which is secured, as by cap screws 157, a pair of concentric, downwardly and inwardly convergent inner and outer walls 158 and 159 surrounding a central blow pipe 160 communicating with the passage 153, as through a fitting 161. A cylindrical sheet metal divider 162 is interposed between the inner wall 158 and the pipe 160. The walls 158, 159 and the divider 162 in cooperation with the pipe 160 define a plurality of concentric cooling compartments 163, 164, 165 and 166 which are interconnected through ports 167 for the flow therethrough of a fluid coolant, such as air, introduced thereinto through the concentric passages 153 and 154. Actually, air is introduced into the two innermost compartments 163 and 164 and flows therefrom into the outer compartments 165, 166 for dissipation into the atmosphere.

Secured to the outer wall 159 and through the flange 156 and the hub 151 to the spindle 131 is a nose piece 170 having a lower cylindrical portion 171 and an upper, generally outwardly flaring peripheral wall 172, which is non-circular in cross section and which is joined to the cylindrical nose piece 171 through a curved transition area 173 to be hereinafter more fully described. Surmounting the nose piece 170 and also secured to the outer wall 159, as by cap screws 174, is an outer sheet metal, non-chilling peripheral wall 175 also of a contour to be hereinafter more fully described. The sheet metal exterior wall 175 is secured to the outer of the concentric walls 159 against relative lateral movement by laterally extending tie bolts 176.

To actuate the spindle 131 and the pressing tool 150 carried thereby longitudinally of the beam 61, the carriage heretofore described and including the spindle housing 115 and the rollers 125 and 127 carried thereby is utilized.

Secured to the lower support plate 123 of the carriage are a pair of upstanding ears 180 (FIGURES 10 and 11) receiving therebetween a pivot pin 121 for securing to the carriage the actuating rod 182 of a fluid pressure actuated slide cylinder 183. This slide cylinder 183 is medially pivoted, as by pin 184 to a pivotally mounted hangar bracket 185 which is mounted on a transverse pivot pin 186 carried by fixed mounting plate 187. This mounting plate 187 is secured to the two beam side plates 70 in fixed relation and has secured thereto a pair of internally threaded adapters 188 into which are threaded vertically extending screws 189 rotatable by means of hand wheels 190.

The two spaced adjusting screws 189 contact the pivotal mounting bracket 185 to either side of the transverse axis of the elongated pivot pin 186 and serve to rock the bracket 185 about the axis of the pivot pin, thereby displacing the cylinder pivot pin 184 rotationally about the axis of the pin 186. In this manner, the fluid pressure actuated slide cylinder 183 is displaced longitudinally of the beam, the mounting thereby provides an extremely accurate adjustment in minute increments of the cylinder position relative to the vertical axis of the mold 52.

Also carried by the carriage plate 120 is an upstanding bracket 192 (FIGURE 11) for supporting a transversely mounted detent cylinder 193, the actuating rod 194 of which is pivotally connected, as at 195, to a detent lever 196. This lever 196 is medially pivoted, as at 197, to the support plate 120. The free end of the detent lever 196 carries a roller 198 engageable in the notch 144 formed in the periphery of the detent plate 143 which is co-rotatable with the spindle 131. When the cylinder 193 is actuated to extend the actuating rod 194 thereof, the detent lever 196 is rotated in a clockwise direction to engage the roller 198 in the detent recess 144, thereby locking the spindle 131 against rotation. Retraction of the actuating rod 194 will withdraw the roller 198 from the recess 144, and thereby free the spindle 131 for rotation. By orienting the mold rotationally through the clutch mechanism 57 and orienting the pressing tool 150 through the detent mechanism 193, 196, the mold and the tool are rotationally aligned.

As best illustrated in FIGURE 13 of the drawings, carried by one of the side plates 170 at a longitudinal position corresponding closely to that occupied by the spindle 131 when aligned with the lower mold 52, is a fixed upstanding bracket arm 200 having an inwardly projecting terminal bracket block 201 carrying a vertically disposed pivot pin 202. The bifurcated arms of the bracket 201 have interposed therebetween a bearing extension 203 formed as a part of a friction plate 204 cooperable with the annular friction surface 149 which is rotatable with the spindle 131. The friction plate 204 is elongated longitudinally of the beam 61 and is pivotally moved about the axis of the pivot pin 202 by a fluid pressure actuated piston 205 pivotally supported on a mounting bracket 206 secured to the beam side plate 70 and pivotally connected, as at 207, to the pivot plate 204.

In FIGURES 6 through 9 of the drawings, there is illustrated the cooperation of the mold 52 and the pressing tool 150 during the pressing operation.

As illustrated in these figures of the drawings, the mold 52, which is rotatable about a vertical axis, is provided with a lower substantially tubular passage 210 into which the lower nose section 171 of the tool 150 projects. This lower tubular section 210 merges through a frusto-conical transition portion 211 cooperable with the surface portion 172 of the tool into upper side wall portions 212 defining the widely divergent side walls of the cathode-ray tube envelope or similar article. The mold is provided with peripheral cooling flanges 213 and with an upstanding terminal lip 214 having corner areas 215 of increased height to avoid spilling of the glass from the mold during its centrifugal rotation.

The pressing tool 150, as heretofore described is provided with a lower generally cylindrical nose section 171, a curved transition portion 173 and an upper frusto-conical section 172 which merges into the sheet metal side walls 175. The present invention is concerned primarily with the transition area 173 which is viewed in section in FIGURE 9 of the drawings. As therein shown, the mold inner wall surface 211 is substantially circular in cross section, and the transition area 173 of the pressing tool 150 is provided with peripheral protuberances 216 which are radially enlarged and which are displaced 90° relative to one another for peripheral alignment with the diagonals of the generally rectangular upper open end of the final tube.

The locking detent mechanism heretofore described and including the plate 143 is so positioned that the notch 144 is engaged by the detent roller 198 when the protuberances 216 are so aligned with the diagonals of the open end of the tube.

Figure 7:
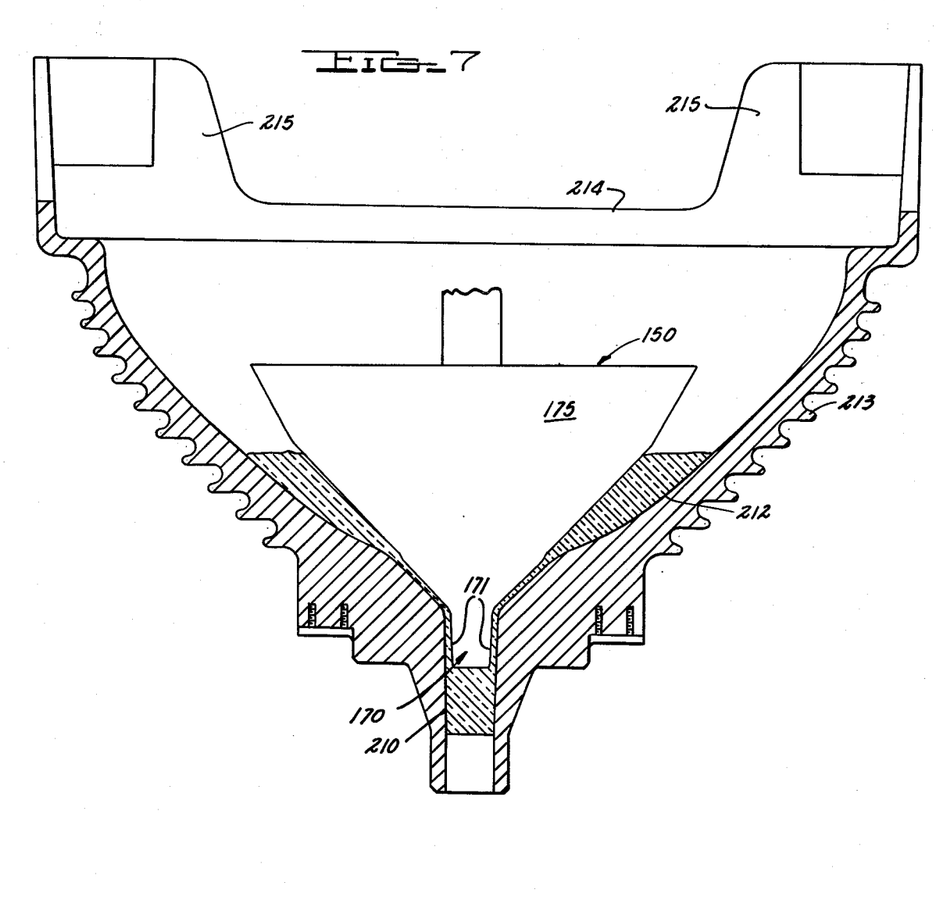
FIGURE 7 is a sectional view taken along the plane 7—7 of FIGURE 6.
Figures 8, 9:
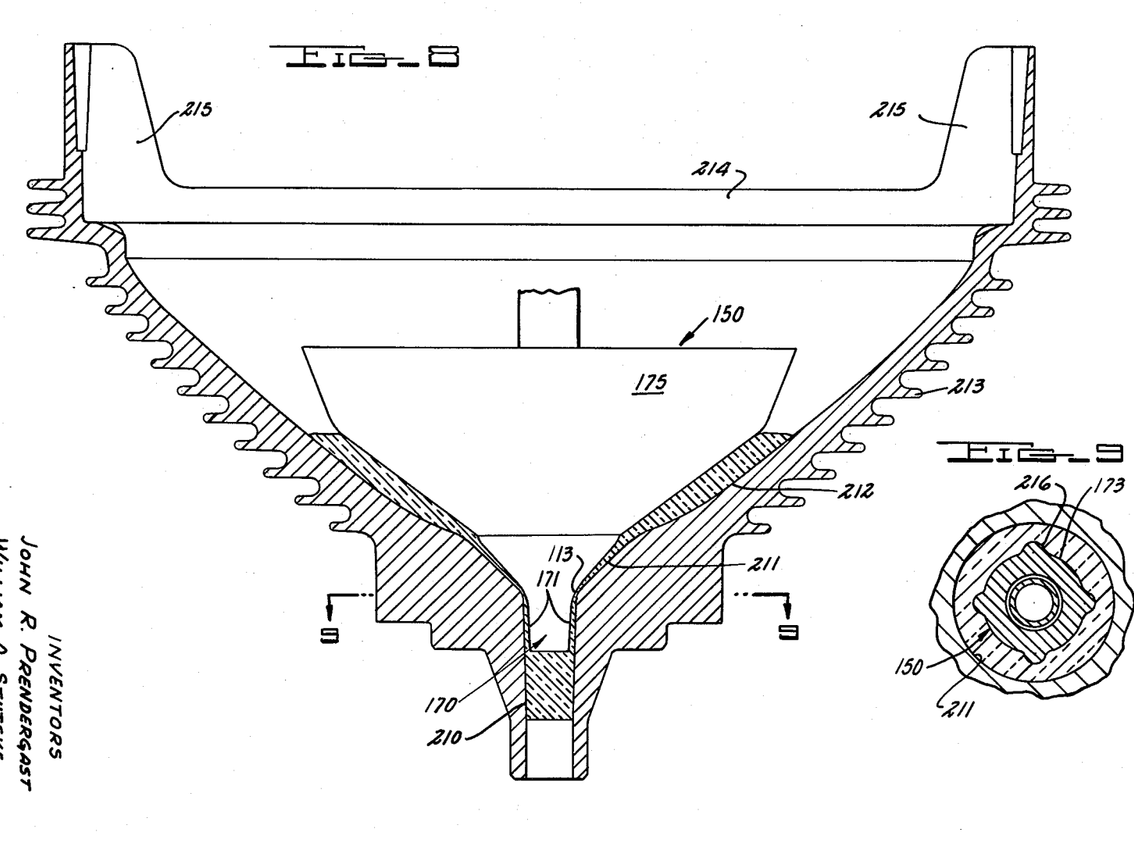
FIGURE 8 is a sectional view taken along the plane 8—8 of FIGURE 6.
FIGURE 9 is a sectional view taken along the plane 9—9 of FIGURE 8.

As seen by a comparison of FIGURES 7 and 8 of the drawings, the result is a substantial reduction in the side wall thickness of the pressed portion of the final article in alignment with the diagonals, thereby opening up the transition portion of the final article for increased beam clearance.

A full disclosure of the structure of the final article and of the orientation of the reduced throat portions thereof with respect to the open end of the final envelope is to be found in the above-identified co-pending patent application of Coleman and Mayhew.

Control System and Operation

Figure 15:
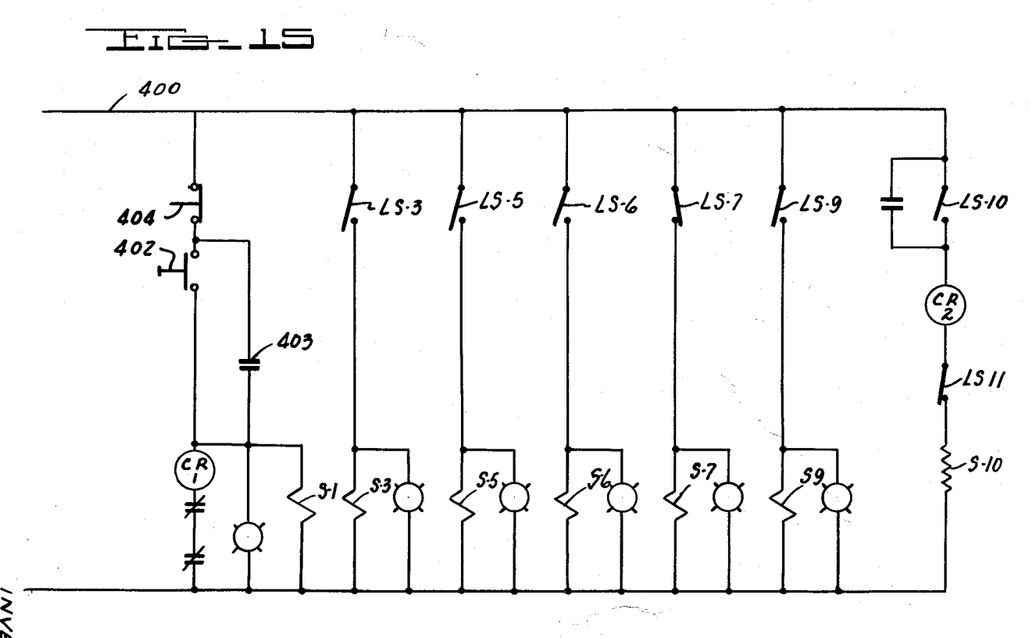
FIGURE 15 is a schematic view of an electric control circuit for the apparatus.
Figure 16:
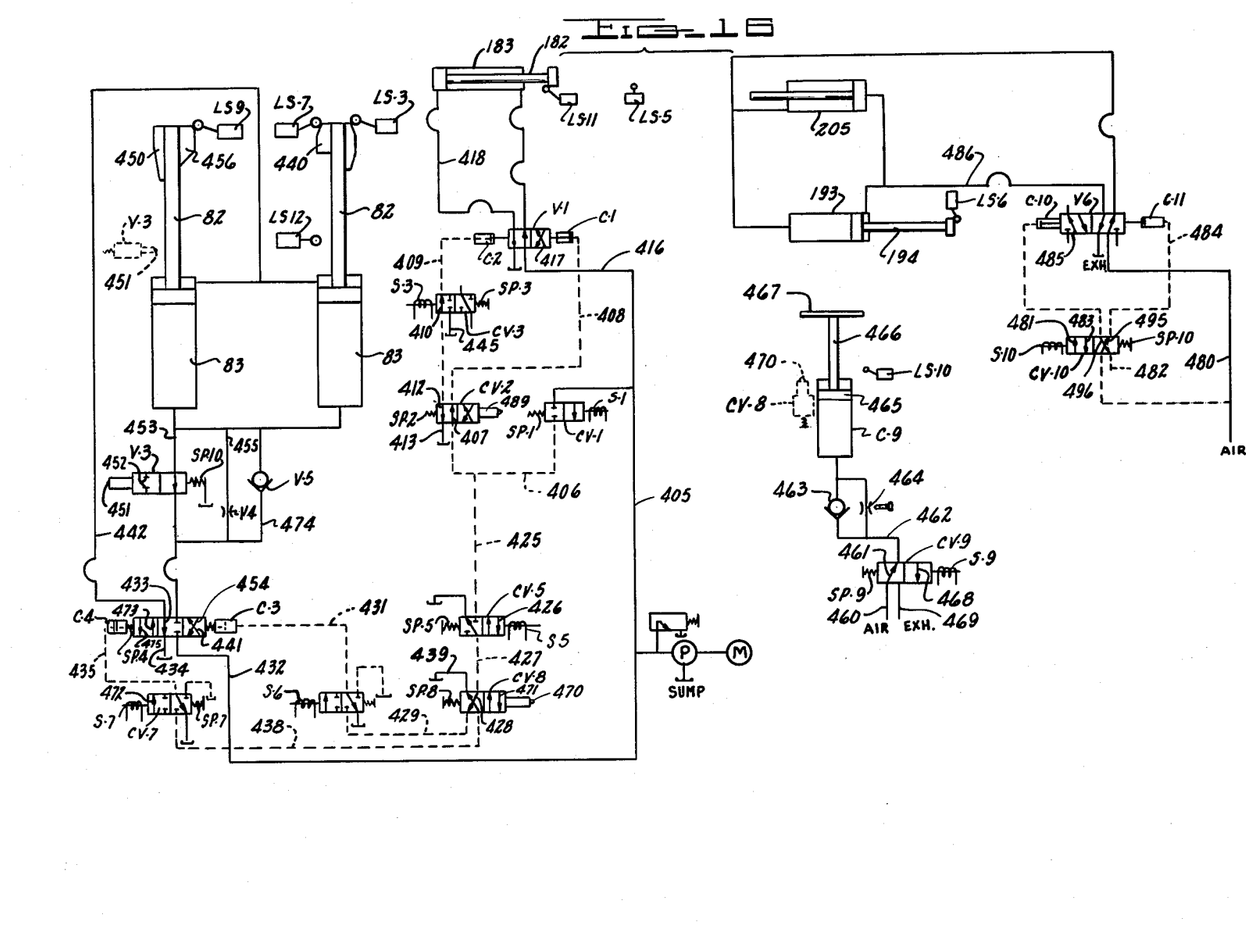
FIGURE 16 is a schematic representation of a combined hydraulic and pneumatic control system for the apparatus.

The hydraulic and electric control systems for the device heretofore described are best illustrated schematically in FIGURES 15 and 16 of the drawings, respectively.

As illustrated in these two figures of the drawings, the machine is shown at rest and prior to the initiation of a complete forming cycle. More specifically, the pressing plunger is raised from its pressing position and is retracted from alignment with the mold in order to accommodate the dropping of a gob from the overhead delivery mechanism and shears into the mold. Thus, the slide cylinder is retracted laterally and the pressing cylinders are at their upper positions.

To best understand the operation of the invention, the operation will be described in connection with the hydraulic and pneumatic control systems and the electrical controls related thereto through an entire cycle of the method.

To initiate the cycle, the electric power lines 400 and 401, connected to any suitable source of current, preferably direct current, are interconnected by depressing the start button 402, thereby energizing relay CR1 closing a holding circuit through contacts 403 by-passing the start button 402 and energizing a solenoid S1. A stop button 404 is interposed in the circuit, this stop button being outside the holding circuit comprising the contacts 403.

Energization of the solenoid S1 actuates a control valve CV1 to the left, as viewed in the drawings, against the pressure of spring SP1 to interconnect fluid pressure line 405 and outlet line 406. The fluid pressure line 405 receives hydraulic fluid under pressure from any suitable source, such as pump P driven by motor M and having its intake side disposed within a sump S.

Pressure fluid is thus supplied through line 406, passage 407 in the control valve CV2 and through a line 408 into an actuating cylinder C1 for valve V1. The opposing actuating cylinder C2 for the valve V1 is vented through line 409 and passage 410 of control valve CV3 through line 411 and valve passage 412 of the valve CV2 back to the sump through drain line 413. The control valve CV2 is held in its illustrated position by spring SP2 and the control valve CV3 is held in its actuated position by solenoid S3 energized by limit switch LS3 actuated by cam 415 adjacent the upper extremity of one of the pressing cylinders.

Shifting of the valve V1 to the left will cause the flow of pressure fluid through branch pressure lines 416, passage 417 in the valve V1 and line 418 to the rear end of the slide cylinder 183, thereby actuating the slide cylinder piston and actuating rod 182 to the right. Such extension of the actuating rod 182 moves the slide carriage and the pressing tool carried thereby to the right and into vertical alignment with the mold 52 therebneath. Upon attaining a position in alignment with the lower mold 52, the slide cylinder rod 182 contacts limit switch LS5, thereby actuating solenoid S5 and shifting control valve CV5 to the left from its illustrated position. Such shifting of the valve CV5 interconnects branch pressure line 425, valve passage 426 and pressure line 427. This pressure line 427 is connected through passage 428 of control valve CV8 with a pressure line 429 leading to control valve CV6. The control valve CV8 is positioned as illustrated by its spring SP8.

The control valve CV6 has been previously shifted to the right from its illustrated position by actuation of its solenoid S6 through limit switch LS6 which is actuated by the orient detent piston rod 194 when the pressing plunger spindle 131 is held against rotation by the detent mechanism. Such actuation of the valve CV6 connects pressure line 429 through valve passage 430 with line 431 effective to energize a hydraulic actuating cylinder C3 for valve V2.

Valve V2 is a three position, four-way valve normally urged by springs SP4 to a central or neutral position at which a branch pressure line 432 dead-ends within the central part of the valve and a drain passage 433 internally of the valve is connected to a drain or sump line 434. Actuation of cylinder C3 will displace the valve V2 to the left from its illustrated position, since the other control cylinder C4 thereof is connected to the sump through line 435, valve passage 436 of control valve CV7 and drain line 437. The valve CV7 can be shifted to the right from its illustrated position by closure of the limit switch LS7 held open by a second cam surface 440 on one of the pressing cylinders or, actually, on the bridge 62.

Upon closure of LS7, solenoid S7 will be energized, displacing CV7 to the right to connect line 435 with line 438 which communicates with sump line 439 through valve CV8. Thus, closure of LS7 effects no instantaneous change in the system, but conditions control cylinder C4 for actuation upon shifting of CV8, as hereafter explained.

Displacement of the valve V2 to the left, as a direct result of actuation of LS5, will interconnect the branch pressure line 432 through valve passage 441 with branched conduit 442 to the upper ends of the pressing cylinders 83, thereby displacing the cylinder actuating rods 82 downwardly. Such displacement of the cylinders downwardly will de-activate limit switches LS3 and LS7 but such de-activation does not influence the continued cylinder displacement, since deactivation of solenoid S3 allows spring SP3 to shift the control valve CV3 to the left, thus connecting the line 409 with a sump or drain line 445. Thus, the actuating cylinder C2 for the valve V1 will continue to be connected to drain. Similarly, de-activation of the switch LS7 will actuate solenoid S7 and accommodate displacement to the right of control valve CV7, as above explained.

Thus, the pressing cylinder shall continue to move downwardly despite the de-activation of limit switches LS3 and LS7.

As the cylinders approach the lower limits of their range of movement, a deceleration cam 450 illustrated as carried by one of the pressing cylinders, but actually on the bridge 62 contacts a roller 451 at the end of a deceleration valve V3, thereby displacing the valve V3 to the right from its illustrated position against the bias of a spring SP10 and placing a valve stop passage 452 in the common drain line 453 of the two pressing cylinders. When the valve V3 is in its illustrated position, this drain line 453 freely communicates with the drain line 434 for the valve V2 through valve passage 454. However, after such closing movement of the deceleration valve V3, draining of fluid on the lower sides of the pressing cylinder pistons takes place through a variable orifice restrictor valve V4 positioned in branch drain line 455, thereby slowing the rate of downward movement of the pressing cylinder rods 82 and effectively decelerating the pressing cylinder rods 82 and the bridge 62 carried thereby.

Also at the initiation of downward movement of the pressing cylinder rods 82, a timer limit switch LS9 is allowed to close by movement of cam 456, thereby energizing a solenoid S9 and shifting from its illustrated position to the left a control valve CV9. This control valve CV9 is normally positioned by a spring, SP9 to connect an air pressure conduit 460, through passage 461 of valve CV9, with an air pressure line 462 leading to an air pressure actuated cylinder C9. Interposed in the pressure line 462 is a one-way ball check valve 463 and a variable orifice needle valve 464 by-passing the ball check valve 463. The line 462 leads into the bottom of the cylinder C9 and normally maintains in elevated position therein a piston 465, the actuating rod 466 of which projects upwardly beyond the confines of the cylinder C9 to maintain a weight 467 in elevated position.

Upon energization of the solenoid S9 and shifting of the valve CV9 to the left against the force of the spring SP9, a drain valve passage 468 of the valve CV9 connects line 462 with exhaust line 469 because of the presence of the check valve 463 in the line 462. Such exhausting from the cylinder C9 is accomplished through the variable orifice valve 464, and this flow may be very readily regulated in order to very carefully govern the amount of time necessary for the exhausting of air from the cylinder C9 and the consequent downward movement therein of the piston 465 under its own weight, the weight of the actuating rod 466 and of the weight 467.

Thus, the cylinder C9 serves as a fluid pressure regulated "drop timer" and serves to regulate the pressing time or the time of contact of the pressing plunger with the molten glass gob located interiorly of the mold. Such timer operation is initiated by energization of the solenoid S9 as a consequence of actuation of the limit switch LS9 at the initiation of the downward movement of the rods 82 of the pressing cylinders 83. However, the downward or pressing movement of the bridge 61 to bring the forming tool 150 into contact with the gob 62 takes a predetermined time, and this time is merely added to the actual pressing time involved.

At the lower end of the stroke of the drop timer piston 465, the control valve CV8 is actuated by contact of a roller or the like abutment 470 at the end thereof with the timer weight 467, thereby displacing the valve CV8 against the compression of the spring SP8 and disconnecting the line 429 from the pressure branch line 427. By such movement of the valve CV8, the pressure line 427 is connected through a valve passage 471 with the line 438 of the control valve CV7, the fluid pressure passing through passage 472 of valve CV7 into the actuating cylinder C4 for the valve V2. Simultaneously, the control valve CV8 is connected through line 429, valve passage 430 and line 431 to the drain line 439.

Thus, the valve V2 will be shifted completely to the right and will connect branch pressure line 432 through valve passage 473 with line 453 communicating with the lower ends of the pressing cylinders 83. Since the deceleration valve V3 blocks the line 453, flow through line 453 will occur through the one way check valve V5 in line 474, thereby by-passing the restrictor valve V4 and placing full line hydraulic pressure flow on the pressing cylinders 83 to elevate the bridge 70 and the pressing plunger 60 from contact with the glass. The upper ends of the pressing cylinders 83 will be connected through line 442 and a drain line 475 with the sump line 434 of the valve V2.

At substantially the same time that the control valve CV8 was actuated by the drop timer weight 467, a limit switch LS10 was also actuated to displace a control valve CV10 against its spring SP10 by energization of the solenoid S10. The valve CV10 is thus displaced to the right to connect an air pressure supply line 480 through valve passage 481 with an air pressure control cylinder C10 to displace valve V6 to the right from its illustrated position. The air pressure control cylinder C11 at the other end of the valve V6 is connected to exhaust line 482 through valve passage 483 and line 484.

This displacement of the valve V6 will connect line 480 through passage 485 of valve V6 to air pressure line 486 connected to the orient shoe cylinder 205 and the orient detent cylinder 193. The line 486 communicates with the rear end of the orient shoe cylinder 205 and extends the cylinder rod thereof to pivotally move the frictional shoe surface 204 into the path of the annular frictional surface 149 on the pressing plunger shoe 145. At the same time, the line 486 is connected to the forward end of the orient detent cylinder 193 and serves to retract the cylinder actuating rod 194 to thereby withdraw the detent roller 198 from the notch 144 formed in the locking plate 143 which is rotatable with the pressing tool 150. Thus, the tool 150 and spindle 131 are free for rotation and the orient shoe 204 is positioned to effect rotation of the plunger 60 for subsequent re-location.

It will be noted from the electrical diagram that the limit switch 10 is by-passed by a holding circuit utilizing the points of relay CR2, this relay being energized upon concurrent closure of the limit switch LS10 and a limit switch LS11 located in the path of movement of the slide cylinder actuating rod 182 and actuated open when the slide cylinder is substantially completely retracted.

Thus, the solenoid S10 is energized when the drop timer weight 467 reaches bottom, thereby releasing the pressing plunger 60 for rotation. The solenoid S10 remains energized despite re-elevation of the weight 467 and opening of the contacts of limit switch LS10, the weight 467 being elevated upon movement of the control valve CV9 under the influence of its spring SP9 when the solenoid S9 is de-energized by the cam 456 and the switch LS9 upon elevation of the bridge 61.

The pressing cylinders 83 continue to raise the pressing tool 150 with the activation of a limit switch LS12 when the pressing tool 150 has been elevated completely from contact with the glass gob 62. This limit switch LS12 controls actuation of the spin motor circuit (not shown) and effects rotation of the mold 52 and centrifugal formation of the glass article only after the pressing plunger 150 has been elevated from contact with the glass and also only after the pressing plunger has been released for rotation.

The centrifugal casting operation is delayed until after such elevation of the pressing plunger 60 even though the plunger spindle 131 is free to rotate. If desired, the pressing plunger 60 may be allowed to rotate with the glass by the initiation of the centrifugal casting operation with the plunger still in contact with the glass.

The raising movement of the pressing cylinders and the concurrent elevation of the bridge 61 carrying the pressing plunger 60 is continued until limit switches LS3 and LS7 are again actuated. Limit switch LS7 is of no particular consequence at this time, with the exception that the spring SP7 is allowed to move the control valve CV7 to the left to its illustrated position. Since both of the actuating cylinders C3 and C4 are vented at this time to the sump, the valve V2 resumes its centered position holding the pressing cylinder rods 82 and the bridge 61 elevated by virtue of the connection of the upper ends of the cylinders 83 to drain through the valve passage 433 and the blocking of the passage 453 to the underside of the cylinders 83 by the valve V2. Actuation of the limit switch LS3 energizes the solenoid S3 displacing the control valve CV3 to the right against the pressure of the spring SP3 and again interconnecting lines 411 and 409 so as to actuate the hydraulic actuating cylinder C2 for the valve V1. However, retraction of the slide cylinder rod 182 cannot occur until actuation of the control valve CV2 to the left from its illustrated position, and such actuation occurs upon indexing movement of the mold table 54 to remove the mold 52 within which the previous centrifugal casting operation was performed from the pressing station 53 to a next subsequent station 53. At such time, the valve CV2 is displaced to the left by a table detent (not shown) mechanically engaging a projection 490 on the valve CV2, thereby connecting line 408 for the actuating cylinder C1 to the drain line 413 through a valve passage 490 and connecting the pressure line 406 with the line 411 of the cylinder C2 through valve passage 491. Thus, the slide cylinder rod 183 is retracted.

It will be recalled that the orient detent 198 released the pressing plunger 60 for rotation upon its retraction as a consequence of the actuation of solenoid S10. The retraction of the slide cylinder rod 182 and consequent movement of the pressing plunger 60 to the left will bring the pressing plunger flange 149 into contact with the shoe surface 204 and the shoe cylinder rod will be depressed while the pressing plunger spindle 131 is rotated freely about its vertical axis by virtue of its rolling frictional contact with the shoe surface 204. Depression of the shoe surface 204 to allow the pressing plunger flange 149 to pass is accommodated by the fact that the orient shoe cylinder 205 is air actuated and the piston thereof is merely effective to further compress the air within the cylinder 205 as the pressing plunger surface depresses the shoe.

When the slide cylinder rod 182 is fully retracted, it opens limit switch LS11, de-energizing the relay CR2 and opening the holding circuit for the solenoid S10. Thus, the control valve CV10 is shifted to its illustrated position wherein air pressure line 480 is connected with cylinder C11 by valve passage 495 and cylinder C10 is connected to the exhaust line 482 through valve passage 496. Thus, the valve V6 is shifted to its illustrated position wherein the orient shoe cylinder 205 is actuated to retract the surface 204 and the orient detent cylinder rod 194 is extended to insert the detent roller 198 in the notch 144 formed in the detent plate 143 of the pressing plunger 60 when the pressing tool 150 is rotationally oriented in the desired manner. The inertia of the pressing plunger 60 will cause sufficient continued rotation thereof until the detent roller 198 falls into the notch 144 of the plate 143 turning therebeneath.

At this time, the slide cylinder rod 182 is retracted, the pressing cylinder rods 82 and the bridge 61 are elevated, the drop timer weight 467 is elevated for subsequent displacement downwardly, and the pressing plunger 60 is locked in its rotatively oriented position. Thus, the apparatus is conditioned for a next subsequent pressing and centrifugal casting cycle.

We claim:

1. In an apparatus for making a cathode-ray tube funnel member or the like from a molten glass gob introduced into a rotatable centrifugal mold, a pressing plunger insertable into the mold into engagement with the gob prior to centrifugal rotation of the mold, power means for inserting and withdrawing the plunger from the mold, means securing the plunger against rotation during plunger-gob contact and including a detent engageable with the plunger and power means for actuating the detent into and out of engagement with the plunger, and means responsive to withdrawal of the plunger to release the plunger for rotation after the plunger is out of contact with the gob and prior to mold rotation.

2. In a centrifugal casting apparatus for making a glass article in an open-topped mold centrifugally rotatable about a vertical axis and receiving a molten glass gob from an overhead feeder, the improvements of an elongated beam overlying the mold, means supporting said beam at the ends thereof for vertical displacement relative to the mold, a carriage movable longitudinally of the beam and vertically displaceable therewith, a pressing plunger carried by the carriage for longitudinal displacement into and out of registry with the vertical axis of the mold and for vertical displacement with the beam into and out of the mold through the open top thereof, separate fluid pressure actuating means for said carriage and said beam, respectively, and means preventing actuation of said actuating means for said beam if said carriage is not aligned with the axis of the mold, said last-named means including position-responsive means carried by said means and actuated by said carriage when said plunger is aligned with the axis of said mold.

3. In an apparatus for making a cathode-ray tube funnel member or the like from a molten glass gob introduced into a rotatable centrifugal mold, a pressing plunger insertable into the mold into engagement with a portion of the gob prior to centrifugal rotation of the mold, means securing the plunger against rotation during plunger-gob contact during a pressing operation, and means releasing the plunger for rotation after the plunger is at least partially out of contact with the pressed portion of the gob and prior to mold rotation.

4. In a centrifugal casting apparatus for making a glass article in an open-topped mold centrifugally rotatable about a vertical axis and receiving a molten glass gob from an overhead feeder, the improvements of an elongated beam overlying the mold, means supporting said beam at the ends thereof for vertical displacement relative to the mold, a carriage movable longitudinally of the beam and vertically displaceable therewith, a pressing plunger carried by the carriage for longitudinal displacement therewith into and out of registry with the mold and for vertical displacement with the beam into and out of the mold through the open top thereof, separate fluid pressure actuating means for said carriage and said beam, respectively, and means responsive to movement of the carriage to align the pressing plunger axially with the mold for actuating said beam actuating means.

5. In an apparatus for centrifugally forming a molten glass gob to the contour of a cathode ray tube funnel member having a non-circular inner surface contour at the tube apex, rotationally aligned with a rectangular opening remote from said apex, said tube being formed in a centrifugal mold having a generally rectangular open upper end and a lower apex portion which is generally circular in cross section, the improvements of a pressing plunger having a free cantilevered lower end of non-circular configuration, power means for lowering the pressing plunger into contact with the gob for cooperation with the apex portion of the centrifugal mold to press form the gob portion therebetween to an apex contour which is non-circular at its inner surface, means for rotationally aligning the pressing plunger lower end and the mold, means retaining the mold and the rotationally aligned plunger against relative rotation during engagement of the plunger with the gob, power means for raising the plunger from contact with the gob, and means for rotating the mold only after the press forming operation is complete.

6. In a centrifugal casting apparatus for making a glass article in an open-topped mold centrifugally rotatable about a vertical axis and receiving a molten glass gob from an overhead feeder, the improvements of an elongated beam overlying the mold and having an aperture aligned with the vertical axis through which the gob is delivered to the mold, means supporting said beam at the ends thereof for vertical displacement relative to the mold, a carriage mounted on said beam and vertically displaceable therewith, said carriage being longitudinally movable on the beam between a first retracted position and a second extended position, a pressing plunger carried by said carriage for longitudinal displacement therewith and for vertical displacement with the beam when the carriage is in its second position and the plunger is in registry with the mold axis, said plunger being movable into and out of the mold through the open top thereof upon vertical displacement of said beam, said carriage laterally spanning said beam aperture and the pressing plunger blocking said aperture when the plunger is in registry with the axis of the mold, separate actuating means for said carriage and said beam, respectively, and safety means for preventing the retraction of the carriage from its second position to its first retracted position, thereby accommodating delivery of a gob through said beam aperture until after the beam is in its elevated position relative to the mold.

References Cited in the file of this patent
UNITED STATES PATENTS

| | | |
|---|---|---|
| 461,489 | Ripley | Oct. 20, 1891 |
| 2,238,198 | Weber | Mar. 19, 1938 |
| 2,591,521 | De Gier | Apr. 1, 1952 |
| 2,662,346 | Giffen | Dec. 15, 1953 |
| 2,696,699 | Giffen | Dec. 14, 1954 |
| 2,853,834 | Vincent | Sept. 30, 1958 |
| 2,861,394 | Ruff | Nov. 25, 1958 |